United States Patent Office 3,634,412
Patented Jan. 11, 1972

3,634,412
3-[β-(5-NITRO-2-FURYL)VINYL]-5-HALOALKYL-1,2,4-OXADIAZOLES
Hermann Breuer, Regensburg, Germany, assignor to E. R. Squibb & Sons, Inc., New York, N.Y.
No Drawing. Filed July 30, 1969, Ser. No. 846,216
Claims priority, application Germany, Sept. 27, 1968, P 17 95 411.9
Int. Cl. C07d 85/52
U.S. Cl. 260—240 A                 7 Claims

ABSTRACT OF THE DISCLOSURE

3-[β-(5-nitro - 2 - furyl)vinyl]-5-haloalkyl-1,2,4-oxadiazoles are useful as antimicrobial agents. For example, a compound like 3-[β-(5-nitro-furyl)vinyl]-5-chloromethyl-1,2,4-oxadiazole is particularly effective for dermatophytoses. These compounds are produced by the nitration of 3-[β-(2-furyl)vinyl]-5-haloalkyl-1,2,4-oxadiazoles or by the dehydration and cyclization of O-acyl-5-nitro-furanacrylamidoximes.

DETAILED DESCRIPTION

This invention relates to 3-[β-(5-nitro-2-furyl)vinyl]-5-haloalkyl-1,2,4-oxadiazoles, particularly of the formula (I) 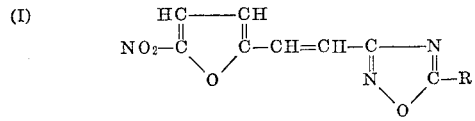

wherein R is a lower alkyl group of up to seven carbon atoms containing one or two halogen atoms. The halo-lower alkyl groups containing one or two halogens include, for example, —$CH_2Cl$, —$CH_2Br$, —$CH_2F$, —$CH_2I$, —$CHCl_2$, —$CHClCH_3$, —$CHBrCH_3$, —$CH_2CH_2Cl$, —$CH_2CH_2Br$, —$CHClCH_2Cl$, —$CHClCH_2CH_3$, —$CH_2CH_2CH_2Br$ —$CHClCH_2CH_3$ $$-CCl\begin{matrix}C_2H_5\\ \\C_2H_5\end{matrix}, \quad -CHClCH\begin{matrix}CH_3\\ \\CH_3\end{matrix} \quad \text{and the like}$$

Preferred is the halomethyl group, particularly chloromethyl.

The compounds of Formula I above may be produced by the nitration of 3-[β-(2-furyl)vinyl]5-haloalkyl-1,2,4-oxadiazole of the formula (II) 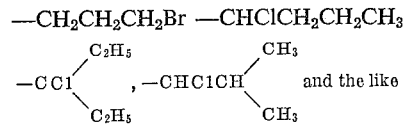

wherein R has the same meanings as above, e.g., using a mixture of nitric acid and acetic anhydride at low temperatures of 0° C. or below.

An alternate process is the dehydration-cyclization of an O-acyl-5-nitrofuranacryl-amidoxime of the formula (III) 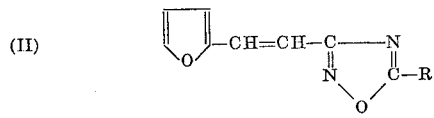

The dehydration-cyclization may be effected in a single step along with the O-acylation of the 5-nitrofuranacryl-amidoxime from which the compound of Formula III is derived by utilizing an excess of acylating agent. Thus, for example, the substance of Formula I may be obtained by treating 5-nitrofuranacrylamidoxime in an organic solvent like dry dioxane with an excess of acid chloride, e.g., halo-lower alkanoyl halides such as α-chloropropionyl chloride, β-chloropropionyl chloride, bromoacetyl bromide, α-bromopropionyl chloride, or the like, in an acid binding agent such as pyridine or other organic bases, preferably at an elevated temperature, e.g., of the order of 50° C.

2-furanacrylamidoxime and 5 - nitro-2-furanacrylamidoxime may be produced, respectively, from 2-furanacrylonitrile and 5-nitro-2-furanacrylonitrile by treatment with an alcoholic solution of hydroxylamine at elevated temperature and, after evaporation of the solvent, treatment of the residue with water, O-acylation may be effected in an organic solvent like dry dioxane with a haloacyl halide like chloroacetyl chloride or dichloroacetyl chloride in the presence of an acid binding agent.

The new compounds of this invention are useful as antimicrobial agents to combat bacteria and fungi such as *Staphylococcus aureus*, *Salmonella schottmuelleri*, *Klebsiella pneumoniae*, *Proteus vulgaris*, *Escherichia coli*, *Trichomonas vaginalis*, *Trichophyton mentagrophytes* or *Candida albicans*, either environmentally or in animal infections.

For example, the compounds of Formula I may be used as surface disinfectants. About 0.01 to 1 percent by weight of a compound or mixture of compounds of Formula I in an inert solid or liquid carrier may be applied as a dust or spray. These compounds may be incorporated in a soap or other cleansing agent, e.g., in a solid or liquid detergent for general cleaning purposes in dairy barns or in food handling equipment.

They may be used in microbial or fungal infections of animals, especially for topical application to the skin of animals infected with organisms such as those named above. For this purpose, a conventionally formulated lotion, salve or cream containing about 0.1 to 3 percent by weight, preferably 0.5 to 2 percent, of a compound or compounds of Formula I may be used. For example, 3-[β-(5-nitro - 2 - furyl)vinyl]-5-chloromethyl-1,2,4-oxadiazole, which is the preferred compound of this invention, is characterized by its topical effectiveness against dermatophytosis in guinea pigs caused by *T. mentagrophytes*, utilizing a concentration of 1% and by the lack of toxicity as indicated by an $LD_{50} > 2.5$ g./kg., orally in mice.

The following examples are illustrative. Temperatures are expressed on the centigrade scale.

EXAMPLE 1

A mixture of 80 ml. of acetic anhydride and 34 g. of nitric acid (d=1.52) is formed at 0°. 28 g. of 3-[β-(2-furyl)vinyl]-5-chloromethyl - 1,2,4 - oxadiazole [prepared by O-acylation of 2-furanacrylamidoxime with chloroacetyl chloride in dry dioxane in the presence of pyridine and then heating in toluene; 2-furanacrylamidoxime (M.P. 68–70°) is prepared by treating 2-furanacrylonitrile with an alcoholic solution of hydroxylamine at 40°, evaporating the solvent and treating the residue with water] are introduced portionwise with stirring at —20°. The substance initially goes quickly into solution. When the last of the oxadiazole is added, a thick crystalline slurry forms. This is stirred for 15 minutes more, filtered under suction and washed with a little cold acetic anhydride. The 3-[β-(5-nitro-2-furyl)vinyl]-5-chloromethyl-1,2,4-oxadiazole is crystallized from acetone, M.P. 128–130°.

EXAMPLE 2

19.7 g. of 5-nitro-2-furanacrylamidoxime (0.1 mol) are suspended in 100 ml. of dry dioxane. 20.4 g. of pyridine (0.20 mol.) are added and then 26 g. (0.2 ml.) of α-chloropropionyl chloride are added with stirring. This is heated slowly to 50° and stirred for another hour at this temperature. The dioxane is distilled off in a rotary evaporator. The residue is treated with water and the organic phase is taken up in ether. The ether solution is treated with charcoal, then the ether is distilled off. The residue is triturated with a little isopropanol. The product 3-[β-(5 - nitro-2-furyl)vinyl]-5(α-chloroethyl) - 1,2,4 - oxadiazole, is filtered under suction and recrystallized from isopropanol, M.P. 79–81°.

EXAMPLE 3

By utilizing 5-nitrofuranacrylamidoxime and β-chloropropionyl chloride according to the procedure of Example 2, 3-[β-(5-nitro-2-furyl)vinyl] - 5 - (β-chloroethyl)-1,2,4-oxadiazole, M.P. 122–123°, is obtained.

EXAMPLE 4

By utilizing 5-nitrofuranacrylamidoxime and bromoacetyl bromide according to the procedure of Example 2, 3-[β-(5-nitro-2-furyl)vinyl]-5-bromomethyl - 1,2,4 - oxadiazole, M.P. 126–127°, is obtained.

EXAMPLE 5

By utilizing 5-nitrofuranacrylamidoxime and α-bromopropionyl chloride according to the procedure of Example 2, 3-[β-(5-nitro-2-furyl)vinyl]-5-(α-bromoethyl)-1,2,4-oxadiazole, M.P. 72–73°, is obtained.

EXAMPLE 6

150 g. of 3 - [β-(2-furyl)vinyl]-5-dichloromethyl-1,2,4-oxadiazole (prepared from 2-furanacrylamidoxime and dichloroacetyl chloride) are added to a mixture of 246 ml. of carbon tetrachloride, 184 ml. of acetic anhydride and 77 ml. of nitric acid (d=1.52) at −20°. The substance at first forms a clear solution but as the last of the oxadiazole is added the reaction product begins to crystallize. The mixture is stirred for 20 minutes more at −20°, then filtered under suction and washed with cold carbon tetrachloride.

A yield of 83 g. of 3-[β-(5-nitro-2-furyl)-vinyl]-5-dichloromethyl-1,2,4-oxadiazole, M.P. 86–91°, is obtained. After recrystallization from isopropanol, the substance melts at 94–95°.

EXAMPLE 7

A 1% creat for topical administration is prepared by intimately admixing the following ingredients:

| | Per gm., mg. |
|---|---|
| 5-(chloromethyl) - 3 - [2-(5-nitro-2-furyl)vinyl]-1,2,4-oxadiazole | 10.0 |
| Promulgen type D (polyoxyethylene fatty alcohol ether) | 114.3 |
| White petrolatum U.S.P. | 0.2 |
| Methyl paraben U.S.P. | 2.9 |
| Propyl paraben U.S.P. | 0.3 |
| Sorbitol solution U.S.P. | 71.4 |
| Antifoam AF emulsion (silicon fluid & silica) | 0.005 |
| Water, purified U.S.P. qs., gm. | 1.0 |

What is claimed is:

1. A compound of the formula:

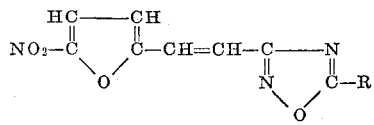

wherein R is halo-lower alkyl containing one of two carbons and one or two halogen atoms, the halogens being chlorine or bromine.

2. A compound as in claim 1 wherein R is chloromethyl.

3. A compound as in claim 1 wherein R is α-chloroethyl.

4. A compound as in claim 1 wherein R is β-chloroethyl.

5. A compound as in claim 1 wherein R is bromomethyl.

6. A compound as in claim 1 wherein R is α-bromoethyl.

7. A compound as in claim 1 wherein R is dichloromethyl.

References Cited

Chemical Abstracts I, vol. 64, cols. 5073 to 5074 (1966) (abstract of Saikawa et al.).

Chemical Abstracts II, vol. 64, col. 1931 (1966) (abstract of British Patent 1,025,439).

Chemical Abstracts III, vol. 67, abstract No. 21916b, p. 2095 (1967) (abstract of Japanese Patent 4591).

JOHN D. RANDOLPH, Primary Examiner

U.S. Cl. X.R.

424—272; 260—347.4